(12) United States Patent
Berube

(10) Patent No.: US 11,681,520 B2
(45) Date of Patent: Jun. 20, 2023

(54) SOFTWARE UPGRADING USING DYNAMIC LINK LIBRARY INJECTION

(71) Applicant: International Business Machines Corporation, Armonk, NY (US)

(72) Inventor: Christopher James Berube, Westminster, MA (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 17/235,509

(22) Filed: Apr. 20, 2021

(65) Prior Publication Data

US 2022/0334828 A1 Oct. 20, 2022

(51) Int. Cl.
  *G06F 8/656* (2018.01)
  *G06F 3/06* (2006.01)
  *G06F 9/445* (2018.01)

(52) U.S. Cl.
  CPC ............ *G06F 8/656* (2018.02); *G06F 3/0604* (2013.01); *G06F 3/0631* (2013.01);
  (Continued)

(58) Field of Classification Search
  CPC ...... G06F 8/656; G06F 3/0604; G06F 3/0631; G06F 3/0676; G06F 3/0679
  (Continued)

(56) References Cited

U.S. PATENT DOCUMENTS

| | | | | |
|---|---|---|---|---|
| 5,414,848 A | * | 5/1995 | Sandage | ............... G06F 9/4484 712/E9.082 |
| 5,615,400 A | * | 3/1997 | Cowsar | ............... G06F 9/44521 711/118 |

(Continued)

FOREIGN PATENT DOCUMENTS

| KR | 100630899 B1 | 9/2006 |
|---|---|---|
| WO | 2022223437 A1 | 10/2022 |

OTHER PUBLICATIONS

Title: Comparative analysis of operational malware dynamic link library (dll) injection live response vs. memory image Author: A Alasiri—published on 2012.*

(Continued)

*Primary Examiner* — Chameli Das
(74) *Attorney, Agent, or Firm* — Gilbert Harmon, Jr.; Christopher M. Pignato

(57) ABSTRACT

Systems, methods, and computer programming products for loading and upgrading software using DLL files injected into a running target program process by a DLL manager of an injection program. Background services of the injection program allocate virtual memory for the code and data within the memory addresses dedicated to the target program process and injects the code and data by writing the code and data of the DLL manager to the virtual memory. A remote thread created within the target program process, controlled by the injection program, executes the DLL manager code, allowing the DLL manager to load and unload DLL files within the target program process. During runtime of the target program process the software can be upgraded, without rebooting the OS executing the target program process, by instructing the DLL manager to unload the DLL file(s), and load and/or re-load updated DLL file(s) within the target program process.

20 Claims, 9 Drawing Sheets

(52) U.S. Cl.
CPC .......... *G06F 3/0676* (2013.01); *G06F 3/0679* (2013.01); *G06F 9/44521* (2013.01)

(58) Field of Classification Search
USPC ........................................................ 717/168
See application file for complete search history.

(56) References Cited

U.S. PATENT DOCUMENTS

| | | | |
|---|---|---|---|
| 5,734,904 A * | 3/1998 | Kanamori | G06F 9/44521 |
| | | | 713/1 |
| 6,405,316 B1 | 6/2002 | Krishnan | |
| 6,665,735 B1 | 12/2003 | Tanaka | |
| 6,708,330 B1 * | 3/2004 | Moberg | G06F 9/44521 |
| | | | 719/331 |
| 6,823,460 B1 * | 11/2004 | Hollander | G06F 9/4484 |
| | | | 712/E9.082 |
| 7,752,618 B2 | 7/2010 | Moles | |
| 7,865,914 B2 | 1/2011 | Jung | |
| 8,209,757 B1 * | 6/2012 | Kennedy | G06F 21/53 |
| | | | 726/23 |
| 8,312,249 B1 * | 11/2012 | Trumbull | G06F 9/44521 |
| | | | 711/206 |
| 8,875,165 B2 | 10/2014 | Lee | |
| 8,955,050 B1 | 2/2015 | Shigapov | |
| 8,997,074 B1 | 3/2015 | Chen | |
| 9,111,087 B2 * | 8/2015 | Jawa | H04L 63/20 |
| 9,158,525 B1 * | 10/2015 | Naganathan | G06F 9/542 |
| 9,306,951 B1 | 4/2016 | Shigapov | |
| 9,372,676 B2 | 6/2016 | Hou | |
| 9,503,107 B1 * | 11/2016 | Kim | H03L 7/099 |
| 9,602,581 B2 | 3/2017 | Stephure | |
| 10,089,461 B1 * | 10/2018 | Ha | G06F 21/56 |
| 10,630,643 B2 * | 4/2020 | Lutas | G06F 9/45558 |
| 11,374,583 B1 | 6/2022 | Bhagavatula | |
| 2003/0172293 A1 * | 9/2003 | Johnson | G06F 21/56 |
| | | | 726/22 |
| 2005/0234616 A1 * | 10/2005 | Oliver | G07C 5/008 |
| | | | 701/31.4 |
| 2006/0026584 A1 * | 2/2006 | Muratori | G06F 9/44521 |
| | | | 717/163 |
| 2008/0301719 A1 | 12/2008 | Roberts | |
| 2010/0077411 A1 * | 3/2010 | Comer | G06F 9/44521 |
| | | | 719/331 |
| 2011/0145643 A1 * | 6/2011 | Kumar | G06F 11/263 |
| | | | 714/33 |
| 2011/0185350 A1 | 7/2011 | Kawahata | |
| 2014/0177558 A1 * | 6/2014 | Bagheri | H04W 24/10 |
| | | | 370/329 |
| 2014/0351833 A1 * | 11/2014 | Teng | G06F 1/1632 |
| | | | 719/328 |
| 2014/0372553 A1 * | 12/2014 | Blackburn | H04L 67/34 |
| | | | 709/217 |
| 2017/0032118 A1 * | 2/2017 | Carson | G06F 21/566 |
| 2020/0034169 A1 * | 1/2020 | Deore | G06F 9/45558 |

OTHER PUBLICATIONS

Title: Software security vulnerability testing in hostile environments author: HH Thompson, published on 2002.*
Title: Run-time dynamic linking for reprogramming wireless sensor networks, author: A Dunkels, published on 2006.*
Title: A survey on virtualization technologies, author: Susanta Nanda et al, published on 2005.*
Title: Lightweight examination of dll environments in virtual machines to detect malware, author: X Xie, et l, published on 2016.*
Kuster, Robert, "Three Ways to Inject Your Code into Another Process", CodeProject, Aug. 20, 2003, 16 pages, <https://www.codeproject.com/Articles/4610/Three-Ways-to-lnject-Your-Code-into-Another-Proces>.
Mell et al., "The NIST Definition of Cloud Computing", Recommendations of the National Institute of Standards and Technology, Special Publication 800-145, Sep. 2011, 7 pages.
"What is a DLL", Microsoft Docs, Apr. 12, 2022, 15 pages, <https://docs.microsoft.com/en-US/troubleshoot/windows-client/deployment/dynamic-link-library>.
Hosseini, Ashkan, "Ten process injection techniques: A technical survey of common and trending process injection techniques", Elastic, Jul. 18, 2017, 24 pages, <https://www.elastic.co/blog/ten-process-injection-techniques-technical-survey-common-and-trending-process>.
International Search Report and Written Opinion, International Application No. PCT/EP2022/060046, International Filing Date Apr. 14, 2022.
Rake, "Guide—DLL Injection Methods", GuidedHacking, Sep. 5, 2020, 16 pages, <https://guidedhacking.com/threads/dll-injection-methods.14569/>.

* cited by examiner

SOFTWARE UPGRADING USING DYNAMIC LINK LIBRARY INJECTION

TECHNICAL FIELD

The present disclosure relates generally to the field of software upgrading and more particularly to dynamic link library injections into software processes to upgrade software without rebooting an operating system (OS) running the software being upgraded.

BACKGROUND

Dynamic link library (DLL) files contain a library of functions and information that can be accessed by a program. DLL files can contain executable code and can introduce functions, classes, variables, user interfaces and resources that an executable programs and other DLL files can use. Typically, when programs launch, links to the DLL file are created. The links to the DLL files can be static or dynamic links. If a static link is created, DLL files will be in use so long as the program remains active, whereas if a dynamic link is created, the DLL files will only be used when the DLL file is needed, helping programs use computing resources such as memory and hard drive space more efficiently. DLL files can be used by more than one program and can even be used by multiple programs at the same time. Unlike programs or applications, DLL files are not directly executed, rather programs and applications load the DLL files.

DLL injection is a technique used for running code within an address space of memory being used for another process of a program. Injection occurs by instructing the running process to load a DLL file containing computer code that can be executed. During DLL injection, the code of the DLL file being injected can be forced to run in place of other code of the process receiving the DLL injection.

SUMMARY

Embodiments of the present disclosure relate to a computer-implemented method, an associated computer system and computer program products for managing the injection of DLL files into programs, allowing software programs to be upgraded with new features introduced by the DLL files being loaded, without having to reboot an operating system (OS) to upgrade the software program. The computer-implemented method comprises the steps of executing, by a processor, an injection program process comprising data and code of a dynamic link library (DLL) manager; allocating, by the processor, virtual memory for the data and the code of the DLL manager in a target program process; writing, by the processor, the data and the code of the DLL manager to the virtual memory of the target program process; creating, by the processor, a remote thread in the target program process; executing, by the processor, the code of the DLL manager in the target program process via the remote thread; and loading, by the processor, a DLL file into the virtual memory of the target program process via the DLL manager.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
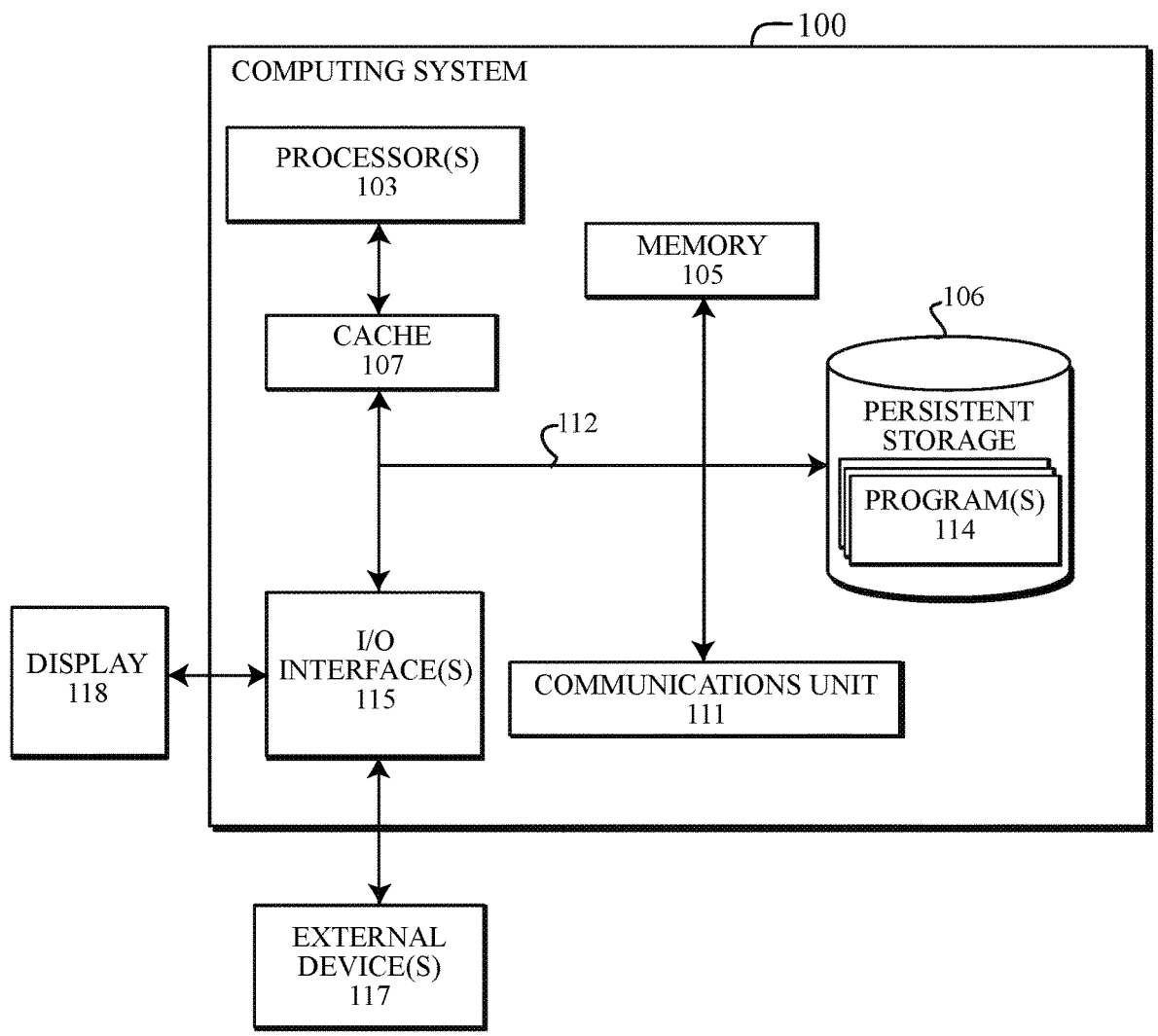
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

DLL injection can be used as a mechanism for software developers and/or third parties to inject DLLs into target processes on a computing system in an effort to integrate the features of the target process of executed software with an external software product that was not specifically designed to work together with software being executed. One method for integrating features of the external software product with the target process of the executed software is to inject data containing the full file path specification of the DLL. The target process can use the injected data to load the DLL from the file path of the injected data by creating a remote thread in the target process and executing a LoadLibrary function.

Embodiments of the present disclosure recognize that this method to load a DLL using the LoadLibrary function can be become problematic and cumbersome when it comes time to upgrade the software product incorporating the injected DLL. Using the LoadLibrary function takes out a reference on the DLL file being injected and prevents other processes from either updating or deleting the DLL file while the DLL file is currently loaded into the memory address of the target process. An end-user seeking to upgrade the software product utilizing the injected DLL must reboot the system and/or at the very least, re-cycle the target process in order to upgrade the DLL file. The end result of using the existing method is a disruption of the services provided by the target processes, which can be unacceptable in some software environments. For example, pausing a database server hosting thousands of users in order to restart the server to perform a software upgrade. Thus, there is a need for a system, computer program products and methods for upgrading target processes running injected DLL files without needing to interrupt the processes to complete updates to the software products or the DLL files being injected.

Embodiments of the present disclosure propose solutions to the existing DLL injection and software upgrading problem, allowing for software upgrades of the executed software products running the injected DLL files, without needing to reboot the operating system and/or re-cycle the target process of the executed software. Avoiding the need to pause software being accessed by potentially thousands of customers while the software is needing to be upgraded. Embodiments of the present disclosure achieve reboot-less upgrades for executed software packages utilizing DLL injection using one or more background services or daemons (i.e., for 32-bit and/or 64-bit processes) performing the injection of data and code into the target process for a DLL manager. The DLL manager performs functions and tasks associated with loading and unloading DLL files being injected into the target process(es) from a storage device or file repository.

Embodiments of the background services or daemons injecting the code and data of the DLL manager may introduce the DLL manager into the target process by allocating virtual memory for the DLL manager data in the target process; write the DLL manager data to the allocated virtual memory for the target process; allocate virtual memory in the target process to the DLL manager code; and write DLL manager code to the allocated virtual memory in the target process. Embodiments of the background service or daemon can execute the DLL manager's code by creating a remote thread in the target process and execute the DLL manager code via the remote process. The DLL manager, once executed, may perform a plurality of named events, triggering load, unload and exit operations. The DLL manager can load the DLL files into the memory of the target process, unload the DLL files from the memory of the target process and/or transmit an exit signal to unload the DLL file and exit the remote thread. For example, when software is ready to upgrade via a new or updated DLL file, the DLL manager can unload the DLL file currently loaded into the memory of the target process and re-load the updated DLL file or load a new version of the DLL file into the target process, without rebooting the OS of the system executing the target process. Moreover, at the time of uninstallation of DLL file or the software product executing the target process, the exit event can unload the target DLL from the memory and exit the remote thread before deleting the DLL from storage.

Computing System

FIG. 1 illustrates a block diagram of an embodiment of a computing system 100, which may be a simplified example of a computing device (i.e., a physical bare metal system or virtual system) capable of performing the computing operations described herein for upgrading software using an injection program to manage an injection of DLL file(s) into targeted software processes, without necessitating a reboot of the operating system running the targeted software process. Computing system 100 may be representative of the one or more computing systems or devices implemented as part of computing environment 200, 400, 500, 600 as shown in FIGS. 2-7, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Upgrading Software Using DLL Injection

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Detailed herein are embodiments of methods, systems and computer program products describing one or more approaches that may be executed using one or more computing systems 100 operating within a computing environment and variations thereof. FIGS. 2-7 depict embodiments of one or more computing environments 200, 400, 500, 600 describing approaches for upgrading software being executed, in runtime, using a DLL manager to load and/or unload DLL files that can be updated to introduce new features, functions resources and components to processes running the software being upgraded, without having to reboot an operating system that is executing the software as the target process.

Figure 2:
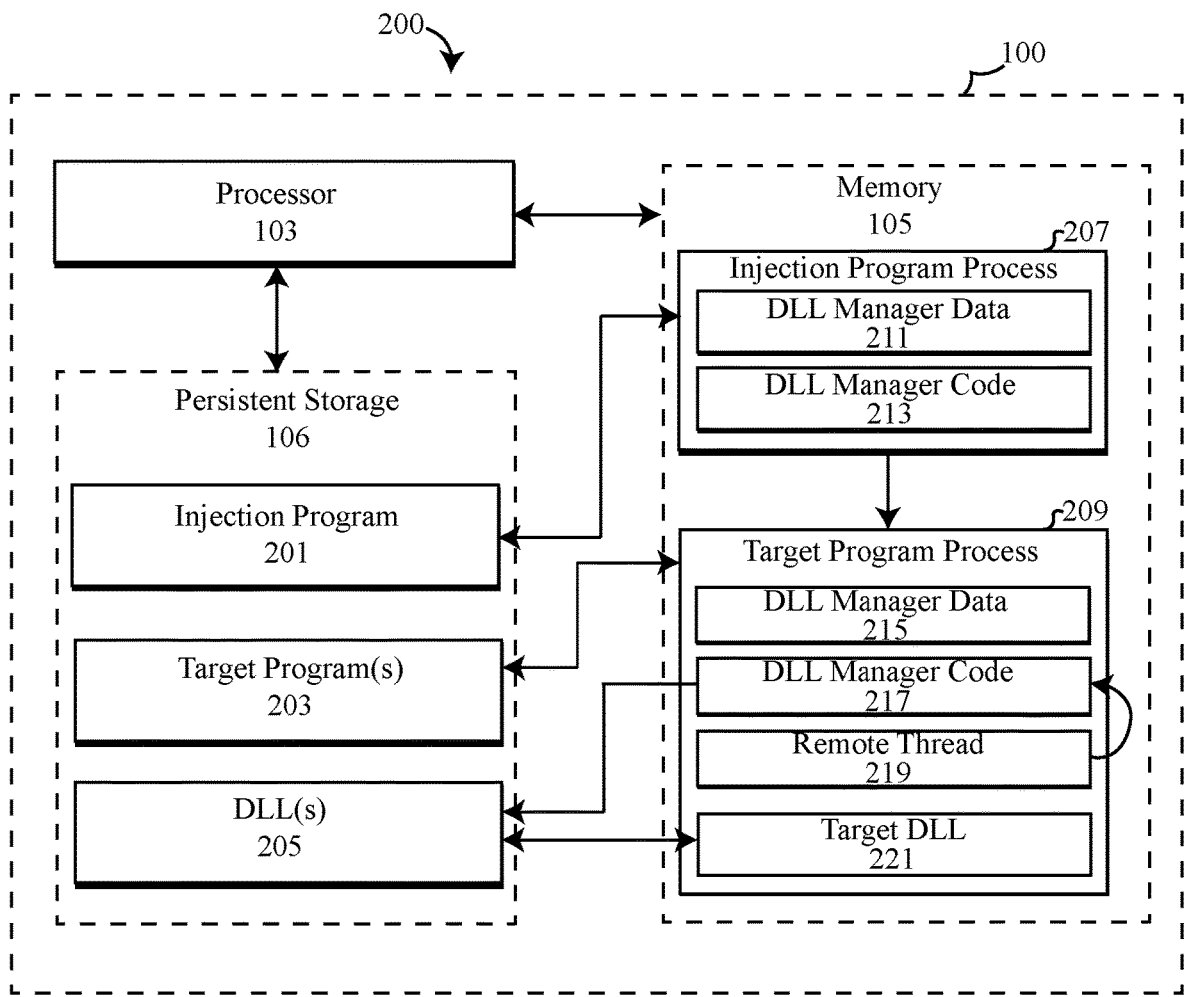
FIG. 2 depicts a functional block diagram describing an embodiment of a computing environment upgrading a target program in accordance with the present disclosure.
Figure 3:
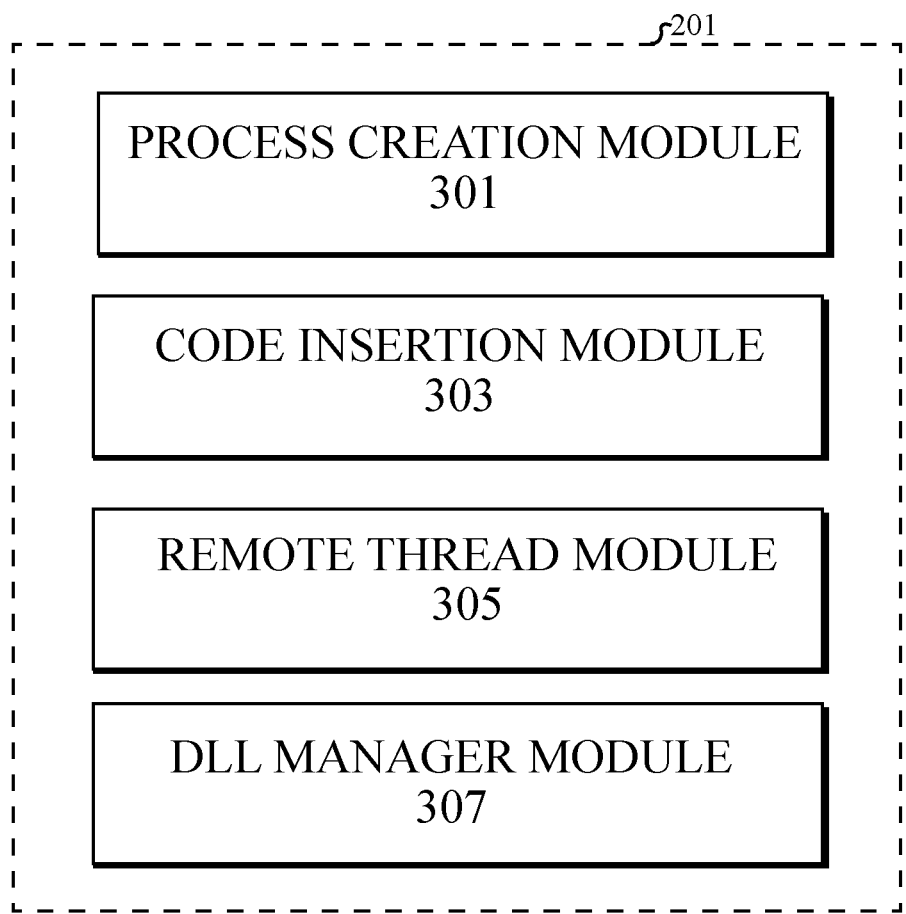
FIG. 3 depicts an embodiment of an injection program in accordance with the present disclosure.

Referring to the drawing of FIG. 2, an embodiment of a computing environment 200 is depicted. In the depicted embodiment of computing environment 200, a computing system 100 executing one or more programs 114 is shown. As depicted in the embodiment of computing environment 200, the computing environment 200 comprises an injection program 201, one or more target program(s) 203 and one or more DLL(s) 205 stored within persistent storage 106. Embodiments of injection program 201 may refer to a software program, application and/or service capable of performing tasks and functions associated with injecting a DLL manager into processes of target program(s) 203 and/or controlling the loading or unloading of DLL(s) into target programs processes 209. Embodiments of the injection program 201 may be executed in memory 105 as injection program process 207 and may contain DLL manager data 211 and DLL manager code 213 for injection into one or more target program processes 209. Embodiments of the injection program may remotely execute the DLL manager code 217 injected into the target program process 209 and transmit one or more signals to the DLL manager, triggering events instructing the DLL manager to call one or more functions.

Embodiments of target program(s) 203 may refer to one or more programs, services, applications or other types of software that may be targeted by the injection program 201 for an injection of one or more DLL(s) 205. DLL(s) may replace and/or add additional functionalities, features, resources and/or code to the existing capabilities of the target program(s) 203. Moreover, in some embodiments, target programs(s) 203 that have already been injected with the functionalities, features, resources and code of an existing DLL(s) 205 may be upgraded or updated by loading or replacing an existing DLL file (i.e., target DLL 221) loaded into the memory address space allocated to the target program process 209 of the executed target program(s) 203 with an updated or new DLL 205 comprising a new set of features, functions, resources and code.

The term "process" may refer to an instance of a computer program that is being executed by one or more threads. A process may comprise program code and data of the computer program. Depending on the operating system being utilized, multiple threads of execution may be executing the program instructions of the program code simultaneously or concurrently. Embodiments of programs 114 may be described as a passive collection of instructions while stored in a file that is maintained by persistent storage 106. Upon execution of the program, the program instructions are loaded from persistent storage 106 into the memory 105 as a process for execution. Several processes may be associated with the same program, and upon execution of the program 114, several instances of the same program can be created, and can result in a plurality of processes for the same program 114. As shown in FIG. 2, upon executing injection program 201 in memory 105, an instance of the injection program 201 is opened, resulting in at least one injection program process 207 being stored in memory 105. Once executed, the injection program process 207 may comprise process-specific data (i.e., input and output) and executable code for a DLL manager, which are depicted in FIG. 2 as DLL manager data 211 and DLL manager code 213. In some embodiments, the injection program process 207 may further include a call stack tracking one or more active subroutines or other events of the injection program and a heap configured to dynamically manage intermediate computational data of the injection program 201 during runtime.

Embodiments of the injection program 201 may further comprise one or more modules or components, specialized in performing the specific functions, tasks or routines of the injection program 201. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 114, program code or linked to program code containing specific programmed instructions loaded into a memory 105 device or persistent storage 106 device of a computing system 100. For example, as shown in the exemplary embodiment of the injection program 201 of FIG. 3, the injection program 201 may comprise a process creation module 301, a code insertion module 303, a remote thread module 305 and/or a DLL manager module 307.

Embodiments of the process creation module 301 may launch the execution of the injection program process 207 in memory 105 and may create target program process 209 as a child process of the injection program process 207. In some embodiments, process creation module 301 may set the target program process 209 in a suspended mode, in order to allow for the DLL manager data 211 and DLL manager code 213 to be inserted into the target program process 209 before the target program process 209 is completed; while the target program process is stacked in memory 105. By placing the target program process 209 in a suspended mode, the process creation module can prevent a failure of the injection of the DLL manager data 211 and DLL manager code 213. For example, under a circumstance wherein the target program process 209 completes execution and is no longer stacked in the memory 105 before completion of the injection of the data and code for the DLL manager. Embodiments of the process creation module 30 may also cancel the suspended mode of the target program process 209 following a successful insertion of the DLL manager data 211 and/or DLL manager code 213, as described in detail below and in accordance with one or more functions and tasks of the code insertion module 303.

Embodiments of code insertion module 303 may perform functions, routines and subroutines of the injection program 201 associated with identifying virtual memory addresses occupied by the target program process 209, memory allocation within the region of the memory 105 where the target program process 209 is stacked using a process handle of the target program process 209 and/or writing DLL manager data 211 and DLL manager code 213 (as represented by DLL manager data 215 and DLL manager code 217) into the virtual memory addresses allocated. Embodiments of the code insertion module 303 may provide instructions to one or more services or daemons (referred interchangeably hereafter simply as "services") running in memory 105 as background services within target program process 209. Embodiments of the service may perform the actual injection of the DLL manager data 211 and the DLL manager code 213 into the memory address occupied by the target program process 209. Embodiments of these services or daemons may provide injections for either 64-bit and/or 32-bit processes, depending on the type of target program process 209 receiving the injected code and data for the DLL manager. In some embodiments, the services providing injections to 32-bit processes and 64-bit processes may be two separate background services.

Embodiments of the background services receiving instructions from the code insertion module 303, may be instructed to allocate and copy the data and code of the DLL manager to the target program process 209 by finding the position where the target program process 209 is stacked in memory 105 using the handle for the target program process 209; allocating virtual memory within the address space allocated to the target program process and writing a copy of the DLL manager data 211 and DLL manager code 213 to the allocated space of the virtual memory. For example, the services being instructed by the code insertion module 303 may focus on the target program process 209 by searching through the running processes of memory 105 to obtain the process ID for target program process 209. Once the process ID of the target program process 209 is known to the injector program process 207, the injection program process 207 may interact with the target program process by calling the OpenProcess( ) function while passing the target program process's process ID as an argument. In response to the OpenProcess( ) call, the OpenProcess function may return the handle for target program process 209 to injection program process 207. In some embodiments, wherein the process creation module 301 has launched the target program process 209 as a child process of the injection program process 207, the handle of the target program process 209 may already be known to the injection program process 207 since the target program process is a child thereof.

Using the handle of target program process 209, obtained by the background services, code insertion module 303 may instruct background services of injection program process 207 to allocate memory and write memory by calling one or more functions or APIs and passing the handle for the target program process 209 to the function being called. For example, one or more background services may be instructed by the code insertion module 303 to call the VirtualAllocEX function. The VirtualAllocEX function allocates virtual memory in the target program process's address space for the injection of the DLL manager data 211. Once allocated, the code insertion module 303 can instruct the background services to write a copy of the DLL manager data 211 to the allocated memory, as DLL manager data 215, by calling the WriteProcessMemory function. Similar to the allocation and writing of the DLL manager data 211, the services may call the VirtualAllocEX function to allocate virtual memory in the target program process's address space for the DLL manager code 213. Upon successful memory allocation in the address space, the services may write a copy of the DLL manager code 213 in the allocated address space, as DLL manager code 217; for example, by calling the WriteProcessMemory function using the handle of the target program process 209.

Embodiments of the injection program 201 may further comprise a remote thread module 305. The remote thread module 305 may perform functions, tasks and/or routines directed toward creating remote threads within the target program process 209 and execute the remote copy of DLL manager code 217 via a remote thread 219. Embodiments of the remote thread module 305 may instruct the background services of the injection program process 207 to call a function or API using the handle of the target program process 209 to create the remote thread 219 in the virtual address space of the target program process 209. For example, background services may be instructed by the remote thread module 305 to call an API or function such as CreateRemoteThread, NtCreatThreadEX or RtCreateUserThread. Upon successful creation of remote thread 219 within the virtual address space of target program process 209, injection program process 207 can remotely instruct the target program process 209 to execute the DLL manager code 217, initiating the DLL manager within the virtual memory of the target program process 209. Moreover, in order to prevent multiple instances of the DLL manager being loaded within the same target program process 209; upon being loaded into the virtual memory of the target program process 209, the executed DLL manager code 217 may create a named mutex to ensure that the mutex must be released by the current remote thread 219 before another remote thread is able to acquire ownership of the mutex and execute the DLL manager code 217.

Embodiments of the DLL manager module 307 may perform functions, tasks and routines that control the actions of the DLL manager by transmitting one or more signals to the DLL manager. The signals may trigger events created by the DLL manager code 217, and execute one or more functions by the DLL manager loaded into the virtual address space of the target program process 209. Embodiments of the DLL manager module 307 may transmit the signals to the DLL manager by establishing a remote communication session with the DLL manager via the remote thread 219. Examples of the signals that may be triggering events for the DLL manager to perform one or more functions may include a "load", "unload" or "exit" signal transmitted by the DLL manager module 307 via the remote thread 219.

In some instances, the DLL manager module 307 may input into the remote thread 219 a load signal. The input of the load signal via remote thread 219 may trigger the DLL manager to execute the "load" event of the DLL manager code 217. The DLL manager may load and initialize one or more DLL(s) 205 stored by persistent storage 106, which may be stored locally within computing system 101 or stored in a remote location remotely accessible via a computing network. For example, upon triggering an event to load DLL 205, the DLL manager may execute a call to perform a LoadLibraryEx function. Execution of the LoadLibraryEx may load DLL 205 into the virtual memory as target DLL 221, initialize functionality of the target DLL 221 loaded into the virtual memory of the target program process 209, and export one or more functions, features and classes of objects stored within the imported target DLL 221 to the target program process 209.

In some instances, the DLL manager module 307 may input via the remote thread 219, an unload signal, triggering an "unload" event of the DLL manager code 217. Embodiments of the DLL manager triggered by an "unload" event may call a function or API to free a target DLL 221 previously loaded into the virtual memory of the target program process 209 and terminate the target DLL 221 from the virtual memory. For example, the DLL manager receiving an unload signal triggers the "unload" event, wherein the DLL manager calls the FreeLibrary function to unload the target DLL 221 from the target program process 209 and terminates the target DLL 221 previously loaded within the virtual memory. By using a combination of "load" and "unload" events, the DLL manager can upgrade or update the target program(s) 203 without rebooting the OS, by replacing the target DLL 221 loaded by the target program process 209 with updated DLL files that may be loaded from persistent storage 106 or another location accessible remotely over a computer network. For example, a DLL manager module 307 inputting via remote thread 219 a load signal triggering the DLL manager to call the LoadLibraryEX function, loads DLL 205 into the virtual memory of the target program process 209 as target DLL 221; initializes the target DLL 221; and exports one or more functions, features and/or resources to target program process 209. Subsequently, after loading the target DLL 221 into memory 105, the target program 203 can be updated to include new features, functions, resources, etc., by unloading and terminating the previously loaded target DLL 221 using an "unload" signal, and re-loading an updated version of target DLL 221 or replacing the previously loaded target DLL 221 by issuing another load signal via the remote thread 219, directing the DLL manager toward the storage location of the updated or replacement DLL to be loaded into the target program process 209.

In some instances, the DLL manager module 307 may input via the remote thread 219, an exit signal triggering an "exit" event to be executed by the DLL manager. Embodiments of an "exit" event execute one or more functions, including but not limited to the terminating the DLL 205 from the virtual memory of the target program process 209, unloading the DLL 205 from memory 105, as well as deleting the named events created by the DLL manager code 217 (e.g., load, unload and exit) and the mutex preventing a second instance of DLL manager from loaded at the same time as the first instance. In some embodiments, the "exit"

event may further de-allocate virtual memory allocated to the DLL manager data 215 and the DLL manager code 217, exit the remote thread 219, delete target DLL 221, close the remote communication session, and/or release the handle of the target program process 209.

Figure 4:
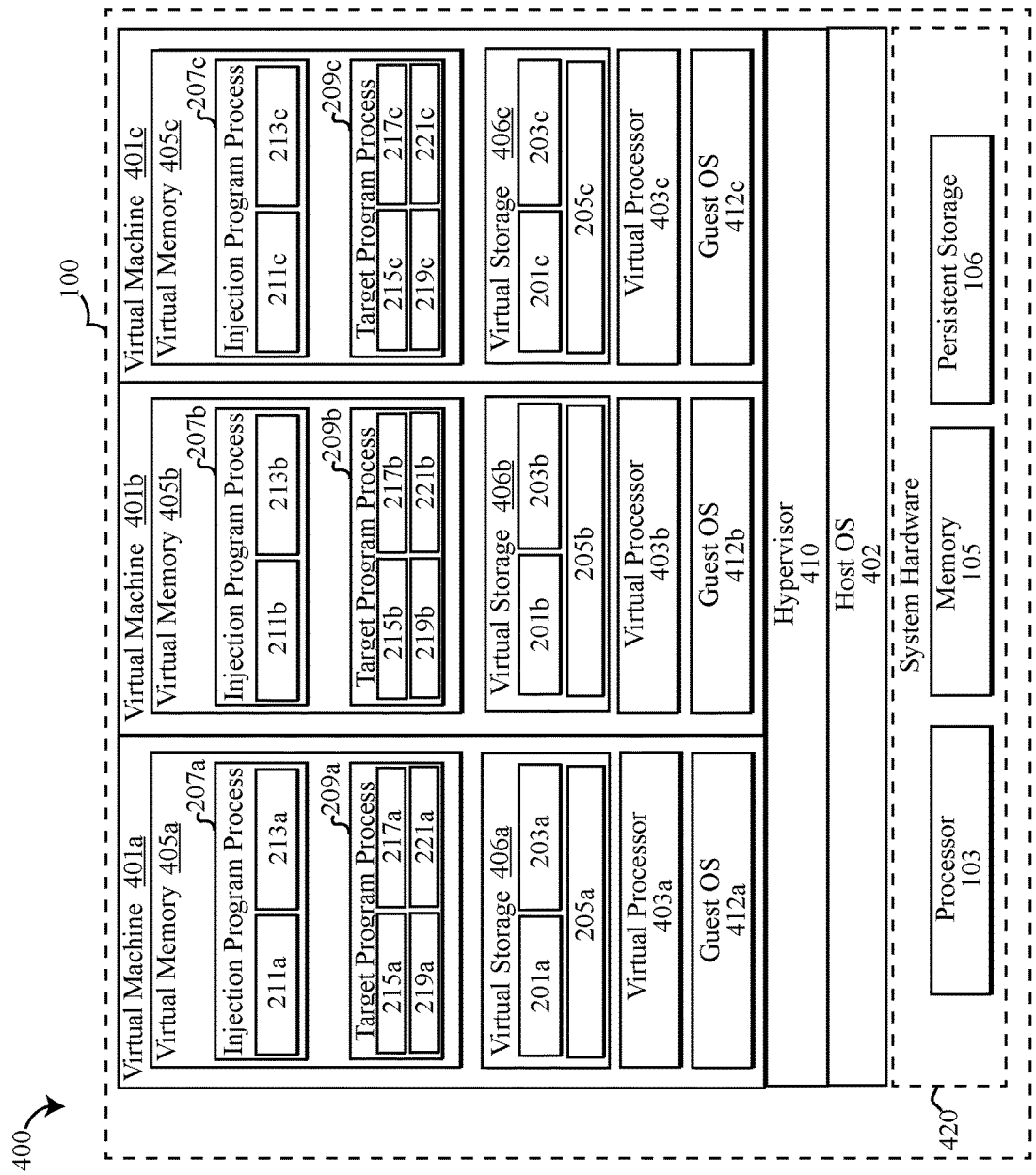
FIG. 4 depicts a block diagram illustrating a computing environment comprising virtual machines in accordance with the present disclosure.

Referring to the drawings, FIG. 4 depicts an embodiment of computing environment 400 applying one or more components, features and principles of computer environment 200 discussed above, to an environment deploying a plurality of virtual machines 401a-401c (hereinafter generally "virtual machines 401") executing one or more target program processes 209a-209c, hosted by computing system 100 (e.g., as a virtual server). Each of the target program processes 209a, 209b, 209c may be processes of the same target program 203a-203c being accessed separately by the virtual machines 401a-401c, or in some embodiments, the target program 203a-203c being executed by the different virtual machines 401a-401c may be different programs served by the computing system 101 operating as a virtual server. Embodiments of computing system 100 may be considered a virtual server capable of allowing a plurality of remote users to access one or more target program(s) 203 via virtual machines 401 and upgrade one or more target program processes 209a-209c being used by the plurality of remote users, across the virtual server without having to reboot either the host OS 402 of computer system 101 or the guest OS 412a-412c of the virtual machines 401a-401c. By upgrading or updating target programs 203a-203c being accessed using the DLL manager to load and/or unload new or updated DLLs 205a-205c, the computing system operating as a virtual server, can avoid a disruption of remote applications and services, such as those provided by target program 203a-203c being accessed by multiple different remote users.

Moreover, it should be noted that while three virtual machines 401a, 401b, 401c are depicted in FIG. 4, any number of virtual machines may be created and hosted by computing system 101. Limitations on the maximum number of virtual machines 401 may depend on the number of resources available and may differ based from system to system based on the specifications of the system hardware 420 present within computing system 101. The limitation of three virtual machines 401 depicted by FIG. 4 is merely to simplify and demonstrate that a plurality of virtual machines 401 may be made available to a plurality of remote users, and that a plurality of target programs 203 can be separately upgraded in a virtualized computing environment 400 using injection program 201 without having to reboot the operating system(s) or interrupt services provided to other remote users accessing the virtual server.

In the embodiment of computing environment 400, the underlying system hardware 420, including processor 103, memory 105 and persistent storage can be allocated as virtualized resources to each of the virtual machines 401 via hypervisor 410. For example, processing power of processor 103 can be allocated as virtual processor 403a-403c; memory can be allocated as virtual memory 405a-405c; and persistent storage 106 can be allocated as virtual storage 406a-406c resources. Embodiments of the virtual server hosting the virtual machines 401a-401c may further include an underlying operating system for the computing system, depicted as host OS 402. Hypervisor 410 may operate as an emulator that creates and runs each of the virtual machines 401a-401c by provisioning and allocating resources from system hardware 420 to each of the virtual machines 401 as virtual resources. Embodiments of the hypervisor 410 may also provision each virtual machine 401a-401c with a guest operating system (guest OS 412a-412c) and/or a virtual operating platform that manages the execution of the guest OS 412a-412c. In some embodiments, instead of a hypervisor 410, a virtual machine monitor ("VMM") or a virtualized may be present.

As shown in FIG. 4, virtual machines may store injection program 201a-201c, one or more target program 203-203c and one or more DLL 205a-205c within the virtual storage 406a-406c provisioned by the virtual server to the corresponding virtual machines 401a-401c. Virtual processors 403a-403c may execute the injection program 201a-201c and/or target program 203a-203c in the virtual memory 405a-405c of the virtual machines 401. Similar to the computing environment 200 of the FIG. 2, the executed injection program 201a-201c being executed by the virtual machines 401 may create an injection program process 207a-207c capable of allocating and writing DLL manager data 211a-211c and/or DLL manager code 213a-213c to target program process 209a-209c. For example, by obtaining a handle to the corresponding target program process 209a-209c being executed by the virtual machine 401a-401c; allocating memory within the target program process's address space within virtual memory 405a-405c to copy the DLL manager data 211a-211c and/or DLL manager code 213a-213c; and writing the code and data of the DLL manager to the allocated space of the virtual memory 405a-405c.

Upon writing the DLL manager data 211a-211c and DLL manager code 213a-213c to the address space of the virtual memory 405a-405c, the remote thread module 305 may create a remote thread 219a-219c within the target program process 209a-209c using the handle of the corresponding target program process 209a-209c. Opening the remote thread 219a-219c creates a remote communication session between the injection program process 207a-207c and the target program process 209a-209c running in the corresponding virtual machine 401a-401c. Embodiments of the code insertion module 303 can instruct the virtual machines 401a-401c to execute the copy of the DLL manager code 217a-217c via remote thread 219a-219c, allowing for the DLL manager module 307 of the injection program 201a-201c to remotely trigger one or more events in the target program process 209a-209c, including load, unload and exit events as described above. For example, the DLL manager module 307 can signal the DLL manager to load one or more DLLs 205a-205c from a stored virtual location of the virtual machines 401, the persistent storage 106 of the virtual server and/or a networked storage device (real or virtual) connected to the virtual server via a computer network. For example, as shown in FIG. 4, DLL 205a-205c may be loaded into the corresponding target program process 209a-209c of the corresponding virtual machine 401a-401c as target DLL 221a-221c. Moreover, when time comes to update the target DLL 221a-221c previously loaded into the virtual memory 405a-405c of the target program process 209a-209c, an unload signal may be transmitted by the DLL manager module 307, causing the target DLL 221a-221c to be unloaded and terminated from the virtual memory 405a-405c of the virtual machine 401a-401c. A new or updated DLL can then be loaded by sending a load signal via the remote thread 219a-219c with instructions to load the new or updated DLL from a specified location, upgrading or updating the target program process 209a-209c with new features, functions, resources, etc. made available via the new or updated DLL. Moreover, because the DLL manager is loading and unloading the DLL files and replacing them with new or updated versions by injecting the DLLs into the target program process 209a-209c, the guest OS 412a-412c and/or the host OS 402 does not need to reboot either the virtual machines 401a-401c to update the injection program 201a-201c with new features and functions provided by the new or updated DLL files being injected.

Figure 5:
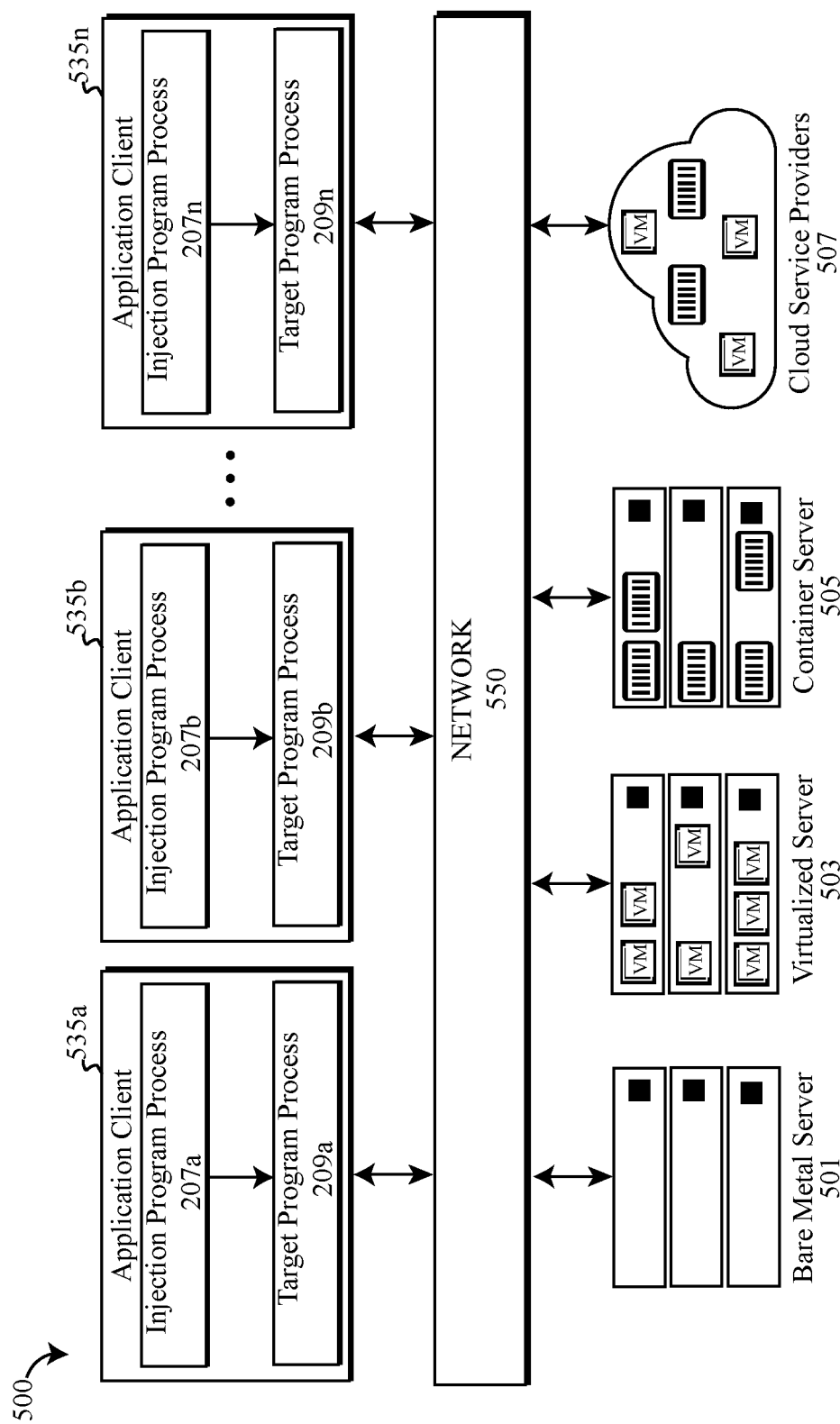
FIG. 5 depicts a block diagram illustrating a computing environment for delivering and upgrading software provided from a plurality of application servers, using DLL injection in accordance with the present disclosure.

Referring to the drawings, FIG. 5 depicts an embodiment of a computing environment 500 illustrating a computing environment 500 wherein injection program 201 is able to upgrade and/or update one or more target programs 203 made accessible via one or more sources providing the target programs 203 over a network 550. For example, the target program 203 and/or the injection program 201 may be made accessible remotely to one or more application clients 535a-535n over network 550 by one or more service providers; including but not limited to bare metal servers 501, virtualized servers 503, container servers 505 and cloud service providers 507. Injection program 201, target programs(s) 203 and/or DLL(s) 205 may be accessed over the network. In some embodiments target program(s) 203 may be downloaded and stored by the application client 535a-535n, by accessing one or more servers or providers 501, 503, 505, 507 allowing the application client 535a-535n to directly execute the injection program 201 and/or target program(s) 203. However, in other embodiments, the injection program 201 and/or the target program(s) 203 may be accessed and/or executed as a service from the service providers server over the network 550 using a cloud computing model of service delivery.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
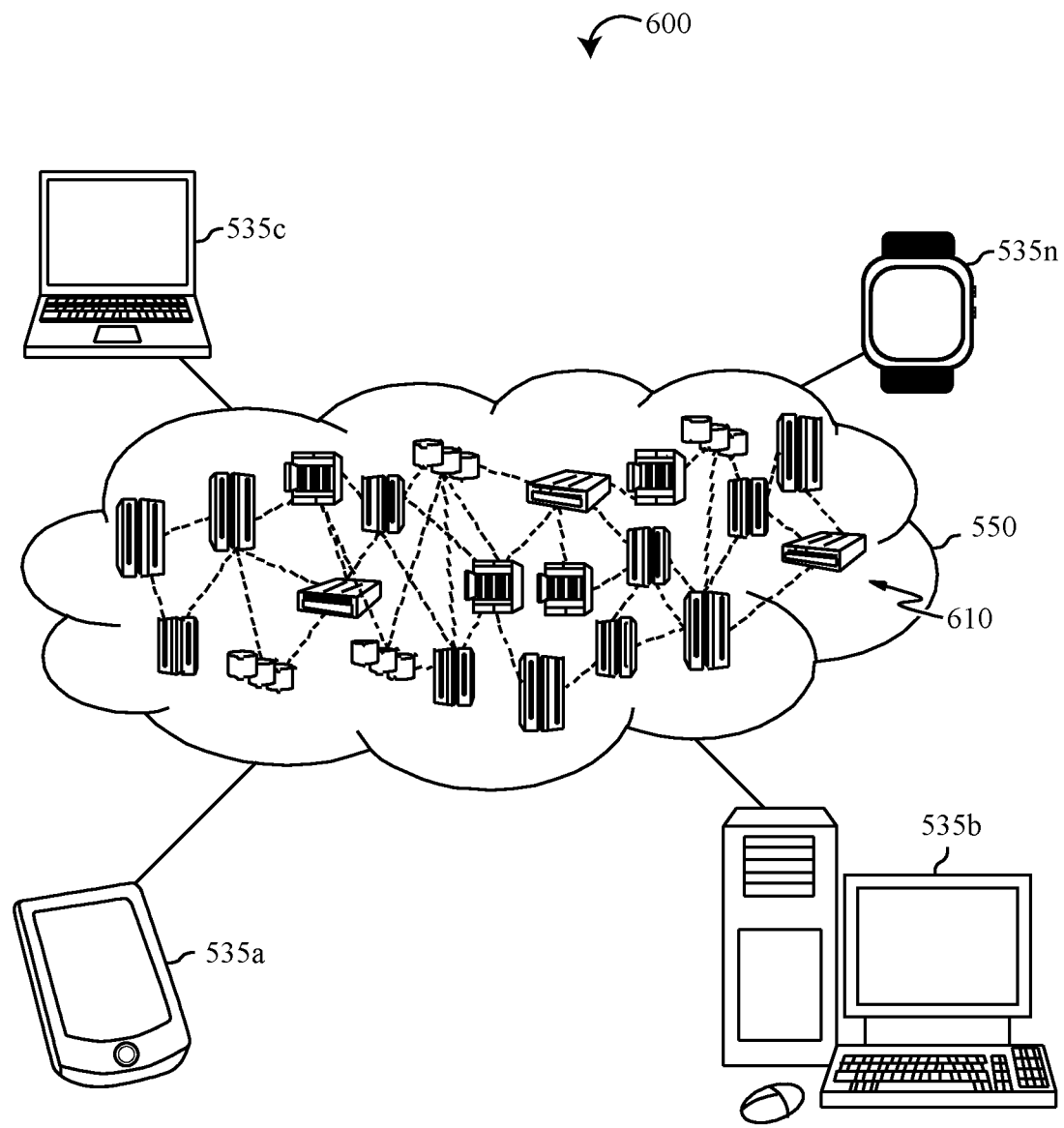
FIG. 6 depicts a block diagram illustrating a cloud computing environment in accordance with the present disclosure.

Referring to the drawings, FIG. 6 is an illustrative example of a cloud computing environment 600. As shown, cloud computing environment 600 includes one or more cloud computing nodes 610 with which user application clients 535a-535n may be used by cloud consumers, to access one or more software products, services, applications, and/or workloads provided by cloud service providers. Examples of the application clients 535a-535n are depicted and may include devices such as a smartphone 535a or cellular telephone, desktop computer 535b, laptop computer 535c, and/or any other computing device including non-traditional computing devices such as internet-enabled smart devices, and IoT devices, such as the smartwatch 535n depicted in FIG. 6. Nodes 610 may communicate with one another and may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of application clients 535a-535n shown in FIG. 6 are intended to be illustrative only and that computing nodes 610 of cloud computing environment 600 can communicate with any type of computerized device over any type of network and/or network addressable connection (e.g., using a web browser).

Figure 7:
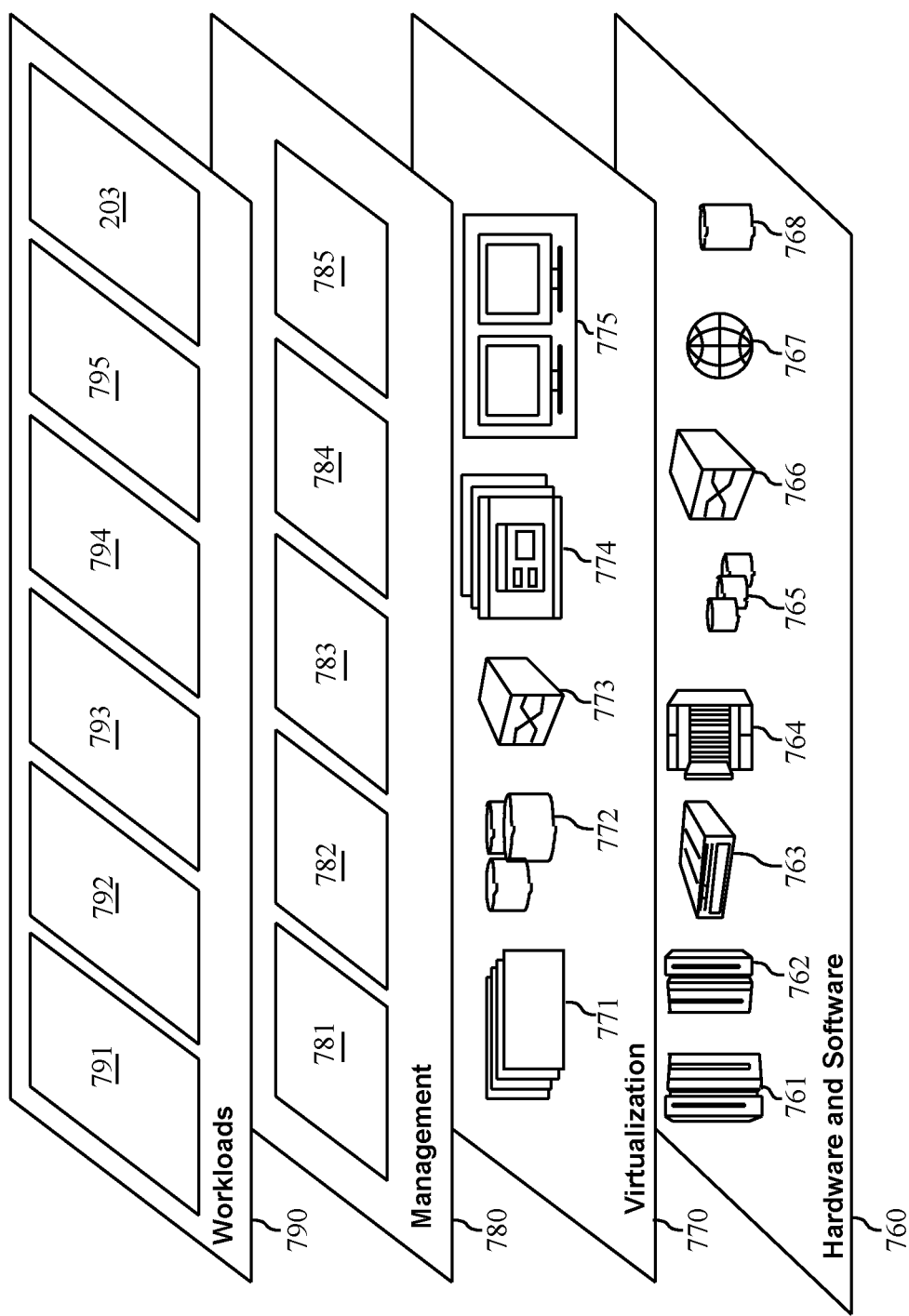
FIG. 7 depicts an embodiment of abstraction model layers of a cloud computing environment in accordance with the present disclosure.

Referring now to FIG. 7, a set of functional abstraction layers provided by cloud computing environment 600 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment 600. Metering and pricing 782 provide cost tracking as resources are utilized within the cloud computing environment 600, and billing or invoicing for consumption of these resources. In one example, these resources can include application software licenses. Security provides identity verification for cloud consumers and tasks, as well as protection for data and other resources. User portal 783 provides access to the cloud computing environment 600 for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include software development and lifecycle management 791, data analytics processing 792, virtual classroom education delivery 793, transaction processing 794; multi-cloud management 795 and target program(s) 203.

Method for Upgrading Software Using DLL Injection

Figure 8A:
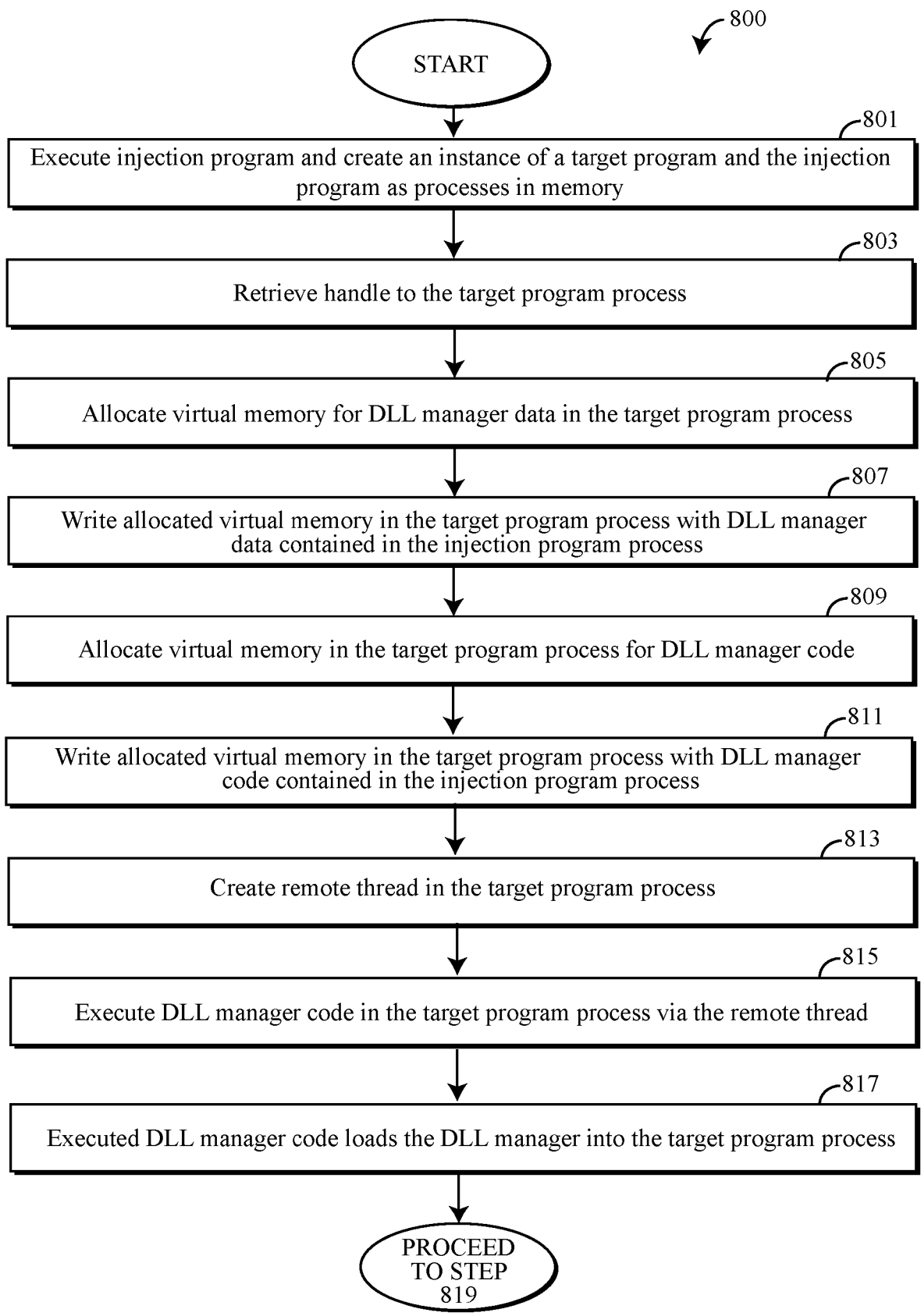
FIG. 8A depicts a flow diagram describing an embodiment of a method for upgrading software using DLL injection, in accordance with the present disclosure.
Figure 8B:
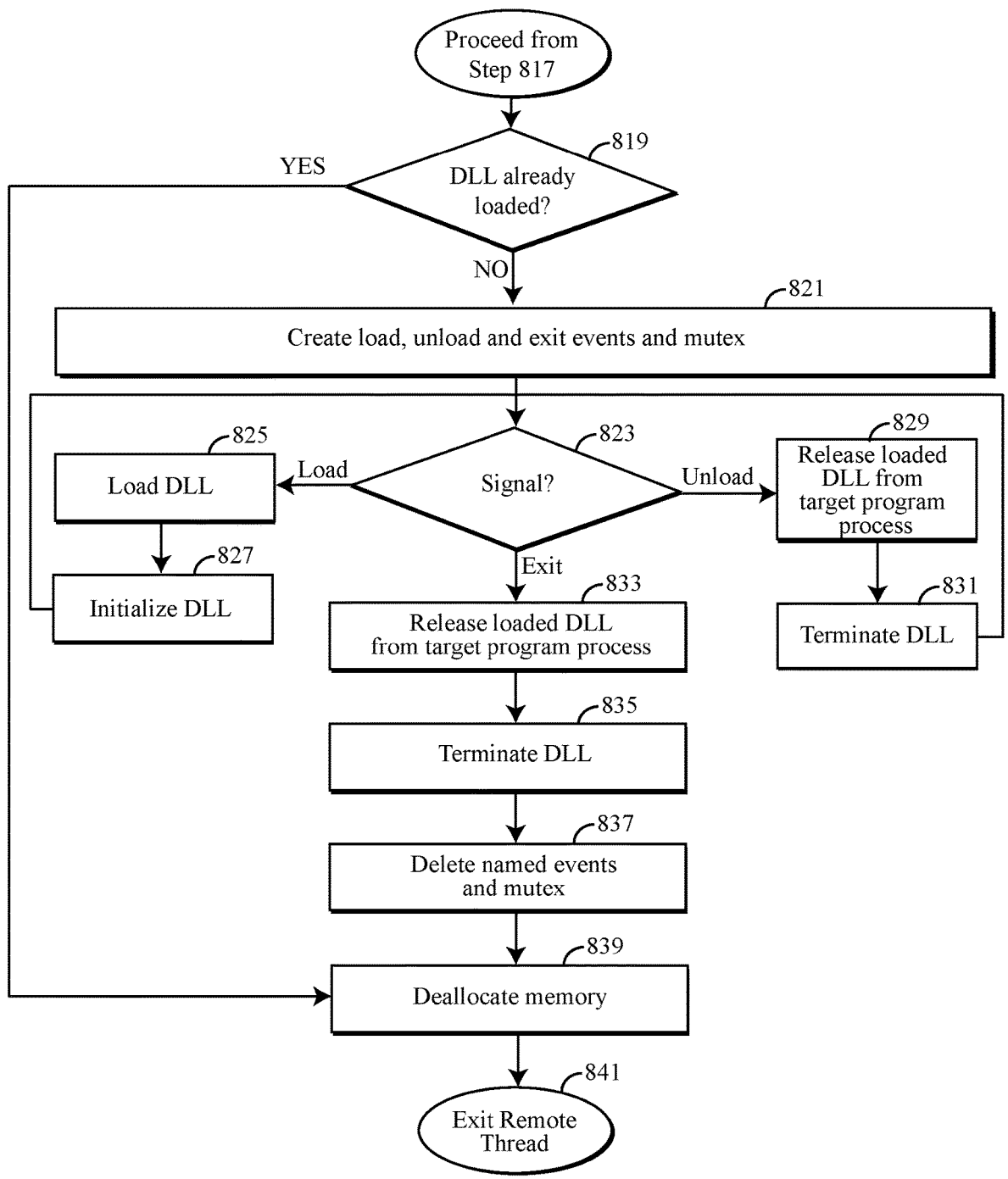
FIG. 8B depicts a continuation of the flow diagram of FIG. 8A describing a continuation of the embodiment of the method for upgrading software using DLL injection, in accordance with the present disclosure.

The drawings of FIG. 8A-8B represent embodiments of a method for upgrading software using DLL injection within a computing environment 200, 400, 500, 600, as described in accordance with FIGS. 2-7 above, using one or more computing systems defined generically by computing system 100 of FIG. 1, and more specifically by the embodiments of specialized computer systems depicted in FIGS. 2-7 and as described herein. A person skilled in the art should recognize that the steps of the method described in FIG. 8A-8B, may be performed in a different order than presented and may not require all the steps described herein to be performed. Rather, some embodiments may alter the methods by using one or more of the steps discussed below.

The embodiment of the method 800 may begin at step 801. In step 801, injection program 201 may be executed, and upon execution, an injection program process 207 may be loaded into memory 105. Embodiments of the injection program 201 may further launch a target program and create an instance of a target program process 209 in the memory 105 for the target program 203 that is executed. In some embodiments, the instance of the target program process 209 in memory 105 may be a child process of the instance of the injection program process 207. Embodiments of the injection program process 207 may place the target program process 209 in a suspended mode that may prevent target program process 209 from completing one or more processes before the injection program process 207 is able to inject DLL manager data 211 and DLL manager code 213 into the target program process 209. In other embodiments, the target program 203 may be executed separately from the injection program 201. Embodiments of the injection program process 207 may be able to identify and target the instance of the target program process 209 in the memory based on the target program process's process ID or name, either automatically or manually by a user.

In step 803, the injection program process 207 may retrieve a handle to the target program process 209. For example, when the target program process 209 is a child process of injection program process 207, the handle may already be known by the injection program process 207. In other embodiments, wherein the handle is not known, the injection program process 207 may call one or more functions to retrieve the handle using the process ID of the target program process 209. For example, injection program process 207 may search a list of running processes by process ID, identify the process ID corresponding to the target program process 209 and call the OpenProcess( ) function using the process ID for the target program process 209. In response to calling the OpenProcess( ) function and inputting the process ID as an argument into the called function, the injection program process 207 may receive the handle for the target program process 209.

In step 805 of method 800, the injection program process 207 may allocate virtual memory for the DLL manager data 211 within the address space provisioned to the target program process 209. For example, by calling the VirtualAllocEx function or API. In step 807, a copy of the DLL manager data 211 may be copied to the virtual memory previously allocated for the DLL manager data 211 in step 805, by writing the allocated virtual memory in the target program process with a copy of the DLL manager data 211 being injected. For instance, in some embodiments, the process of writing the DLL manager data 211 (as DLL manager data 215) to the virtual memory of the target program process 209 can be performed by the injection program process 207 calling the WriteProcessMemory function or API.

In step 809 of method 800, the injection program process 207 may allocate virtual memory for the DLL manager code 213 within the address space provisioned to the target program process 209. For example, by calling the VirtualAllocEx function or API. In step 811, a copy of the DLL manager code 213 may be copied to the virtual memory previously allocated for the DLL manager code 213 in step 809, by writing the allocated virtual memory in the target program process with a copy of the DLL manager code 213 being injected. For instance, in some embodiments, the process of writing the copy DLL manager code 213 (as DLL manager code 217) to the virtual memory of the target program process 209 can be performed by the injection program 201 calling the WriteProcessMemory function or API.

In step 813 of method 800, the injection program process 207 may create a remote thread 219 within the target program process 209; establishing a remote communication session between the injection program process 207 and the target program process 209. Embodiments of the injection program may create the remote thread 219 within the target program process 209 using the previously retrieved handle of the target program process 209 to call a function or API directly targeted to the acquired handle. For example, by calling the CreateRemoteThread function and passing the handle of the target program process as an argument for the function. Once the remote thread 219 has been established, the remote copy of the DLL manager code 217 can be remotely executed by the injection program process 207 via remote thread 219 in step 815. In step 817, the executed DLL manager code 217 loads the DLL manager into the virtual memory of the target program process 209.

In step 819 of the method 800, a determination is made whether the DLL manager loaded into the virtual memory of the target program process 209 during step 817 has already been previously loaded into the target program process 209. For example, when a named mutex for the DLL manager already exists in the target program process 209, a second DLL manager is prevented from taking ownership of the mutex until the previously loaded DLL manager deletes the named mutex. If the DLL manager has already been previously loaded into the virtual memory of the target program process 209, the method 800 may proceed to step 839, wherein the virtual memory allocated to the DLL manager is deallocated and the injection program process 207 exits the remote thread 219. Conversely, if in step 819 the DLL manager has not been previously loaded into the virtual memory of the target program process 209, the method may proceed to step 821.

In step 821, during the loading of the DLL manager into the virtual memory, the executed DLL manager code 217 may create one or more named events, and/or a named mutex that may prevent a second DLL manager from being executed in the same address space of the virtual memory allocated to the target program process 209. Examples of the named events that may be triggered remotely by the injection program process 207 may include a "load", "unload" and "exit" event.

During step 823, the DLL manager loaded into the virtual memory of the target program process 209 awaits to receive one or more signals via remote thread 219, instructing the DLL manager to execute one or more of the named events created during step 821. If the DLL manager receives a load signal, the method may proceed to step 825. During step 825, the DLL manager receiving the load signal may execute the load event, comprising the steps of calling a function or API that loads a DLL 205 from a storage location into the target program process 209 (i.e., as target DLL 221) and in step 827 initializes the target DLL 221, exporting one or more features, functions, resources, etc. into the target program process 209. For example, in step 825, the DLL manager may call the LoadLibraryEx function to load DLL 205 into the target program process 209 as target DLL 221, from a storage location, initializing target DLL 221, and exporting the features, functions and resources of target DLL 221 to target program process 209, wherein the exported features, functions and resources are integrated for use as part of the target program 203 during runtime.

Conversely, if during step 823, the DLL manager receives an unload signal from the injection program process 207 via remote thread 219, the DLL manager executes the unload event. The unload event may include releasing a target DLL 221 loaded in target program process 209 during step 829 and terminating the target DLL 221 from the virtual memory during step 831. Embodiments of the DLL manager can use a combination of load and unload signals to update and/or alter the features, functions, resources, etc. injected into the target program process 209 by the target DLL 221. For example, a target DLL 221 loaded into the target program process and initialized via steps 825 and 827 may be updated or replaced by receiving an unload signal, causing the initially loaded target DLL 221 to be released and terminated via steps 829 and 831. Once unloaded, a second load signal may be received via the remote thread 219, instructing the DLL manager to load a new DLL or an updated version of the target DLL 221 that was previously unloaded. By loading the new or updated target DLL 221 into target program process 209 via steps 825 and 827, the DLL manager can change or add features, functions, resources, etc., to the target program process 209 during the upgrade via the new or updated target DLL 221, without having to reboot an operating system.

Returning to step 823, if during step 823 an exit signal is received, the method 800 may proceed to step 833. During step 833, the DLL manager receiving the exit signal via the remote thread 219, may trigger an exit event, wherein the DLL manager may release the loaded target DLL 221 from the virtual memory of the target program process 209. Moreover, in step 835, the DLL manager may further terminate the target DLL 221, and in step 837, delete the named events and/or mutex corresponding to the DLL manager. In step 839, the virtual memory allocated to the DLL manager, including the DLL manager data may be deallocated from the virtual memory. DLL manager code may remain in the target program process 209. For example, the DLL manager code may remain behind in the target program process 209, in a dormant state for the remaining life of the process and may not be detrimental to the process itself because of how small the file size of DLL manager is (i.e., <3 kb). In step 841, the communication session opened via remote thread 219 may be closed with the injection program process 207, the target program process 209 may exit the remote thread 219, and the injection program process 207 may release the handle for the target program process 209.

What is claimed is:

1. A computer-implemented method for upgrading software comprising:
   executing, by a processor, an injection program process comprising data and code of a dynamic link library (DLL) manager;
   allocating, by the processor, virtual memory for the data and the code of the DLL manager in a target program process;
   writing, by the processor, the data and the code of the DLL manager to the virtual memory of the target program process;

creating, by the processor, a remote thread in the target program process and establishing a remote communication session between the DLL manager and a daemon via the remote thread;

executing, by the processor, the code of the DLL manager in the target program process via the remote thread by the daemon, wherein once executed the DLL manager can perform a plurality of named events during runtime without rebooting an operating system executing the target program process, including loading DLL files into the virtual memory of the target process, unloading DLL files from the virtual memory of the target program process, and a combination of unloading the DLL files and exiting the remote thread; and transmitting, by the processor, a signal via the remote thread to the DLL manager to load a DLL file into the virtual memory of the target program.

2. The computer-implemented method of claim 1, further comprising:

unloading, by the processor, the DLL file from the virtual memory of the target program process via the DLL manager;

updating, by the processor, the DLL file to an updated DLL file; and loading, by the processor, the updated DLL file, via the DLL manager, into the virtual memory of the target program process, wherein loading the updated DLL file into the virtual memory of the target program process upgrades the target program process without rebooting the operating system executing the target program process.

3. The computer-implemented method of claim 2, wherein unloading the DLL file from the virtual memory allocated to the target program process includes the DLL manager calling a FreeLibrary function to unload the DLL file from the virtual memory.

4. The computer-implemented method of claim 1, wherein loading the DLL file into the virtual memory of the target program process is performed by the DLL manager calling a LoadLibraryEX function.

5. The computer-implemented method of claim 1, further comprising:

transmitting, by the processor, an exit signal to the DLL manager, wherein the exit signal unloads the DLL file from the virtual memory allocated to the target program process and exits the remote thread.

6. The computer-implemented method of claim 1, further comprising:

retrieving, by the processor, a handle to the target program process, wherein the DLL manager holds the handle to the target program process, allowing the injection program process to control one or more functions called by the DLL manager to load and unload the DLL file using the handle of the target program process.

7. The computer-implemented method of claim 1, wherein writing the code of the DLL manager to the virtual memory of the target program process is performed by calling a WriteProcessMemory function and executing the code via the remote thread in the target program process occurs by calling a CreateRemoteThread function.

8. A computer system comprising:
a processor; and
a computer-readable storage media coupled to the processor, wherein the computer-readable storage media contains program instructions executing a computer-implemented method comprising the steps of:

executing, by the processor, an injection program process comprising data and code of a dynamic link library (DLL) manager;

allocating, by the processor, virtual memory for the data and the code of the DLL manager in a target program process;

writing, by the processor, the data and the code of the DLL manager to the virtual memory of the target program process;

creating, by the processor, a remote thread in the target program process and establishing a remote communication session between the DLL manager and a daemon via the remote thread;

executing, by the processor, the code of the DLL manager in the target program process via the remote thread by the daemon, wherein once executed the DLL manager can perform a plurality of named events during runtime without rebooting an operating system executing the target program process, including loading DLL files into the virtual memory of the target process, unloading DLL files from the virtual memory of the target program process, and a combination of unloading the DLL files and exiting the remote thread; and transmitting, by the processor, a signal via the remote thread to the DLL manager to load a DLL file into the virtual memory of the target program.

9. The computer system of claim 8, further comprises:

unloading, by the processor, the DLL file from the virtual memory of the target program process via the DLL manager;

updating, by the processor, the DLL file to an updated DLL file; and loading, by the processor, the updated DLL file, via the DLL manager, into the virtual memory of the target program process, wherein loading the updated DLL file into the virtual memory of the target program process upgrades the target program process without rebooting the operating system executing the target program process.

10. The computer system of claim 9, wherein unloading the DLL file from the virtual memory allocated to the target program process includes the DLL manager calling a FreeLibrary function to unload the DLL file from the virtual memory.

11. The computer system of claim 8, wherein loading the DLL file into the virtual memory of the target program process is performed by the DLL manager calling a LoadLibraryEX function.

12. The computer system of claim 8, further comprising:

transmitting, by the processor, an exit signal to the DLL manager, wherein the exit signal unloads the DLL file from the virtual memory allocated to the target program process and exits the remote thread.

13. The computer system of claim 8, further comprising:

retrieving, by the processor, a handle to the target program process, wherein the DLL manager holds the handle to the target program process, allowing the injection program process to control one or more functions called by the DLL manager to load and unload the DLL file using the handle of the target program process.

14. A computer program product for upgrading software comprising:

one or more computer readable storage media having computer-readable program instructions stored on the one or more computer readable storage media, said program instructions executes a computer-implemented method comprising:

executing, by a processor, an injection program process comprising data and code of a dynamic link library (DLL) manager;

allocating, by the processor, virtual memory for the data and the code of the DLL manager in a target program process;

writing, by the processor, the data and the code of the DLL manager to the virtual memory of the target program process and establishing a remote communication session between the DLL manager and a daemon via the remote thread;

creating, by the processor, a remote thread in the target program process;

executing, by the processor, the code of the DLL manager in the target program process via the remote thread by the daemon, wherein once executed the DLL manager can perform a plurality of named events during runtime without rebooting an operating system executing the target program process, including loading DLL files into the virtual memory of the target process, unloading DLL files from the virtual memory of the target program process, and a combination of unloading the DLL files and exiting the remote thread; and transmitting, by the processor, a signal via the remote thread to the DLL manager to load a DLL file into the virtual memory of the target program.

15. The computer program product of claim 14 further comprising:

unloading, by the processor, the DLL file from the virtual memory of the target program process via the DLL manager;

updating, by the processor, the DLL file to an updated DLL file; and loading, by the processor, the updated DLL file, via the DLL manager, into the virtual memory of the target program process, wherein loading the updated DLL file into the virtual memory of the target program process upgrades the target program process without rebooting the operating system executing the target program process.

16. The computer program product of claim 15, wherein unloading the DLL file from the virtual memory allocated to the target program process includes the DLL manager calling a FreeLibrary function to unload the DLL file from the virtual memory.

17. The computer program product of claim 14, wherein loading the DLL file into the virtual memory of the target program process is performed by the DLL manager calling a LoadLibraryEX function.

18. The computer program product of claim 14, further comprising:

transmitting, by the processor, an exit signal to the DLL manager, wherein the exit signal unloads the DLL file from the virtual memory allocated to the target program process and exits the remote thread.

19. The computer program product of claim 14, further comprising:

retrieving, by the processor, a handle to the target program process, wherein the DLL manager holds the handle to the target program process, allowing the injection program process to control one or more functions called by the DLL manager to load and unload the DLL file using the handle of the target program process.

20. The computer program product of claim 14, wherein writing the code of the DLL manager to the virtual memory of the target program process is performed by calling a WriteProcessMemory function and executing the code via the remote thread in the target program process occurs by calling a CreateRemoteThread function.

* * * * *